(12) United States Patent
Aoki et al.

(10) Patent No.: US 10,692,379 B2
(45) Date of Patent: Jun. 23, 2020

(54) IMAGE PROCESSING DEVICE AND IMAGE PROCESSING METHOD

(71) Applicant: SONY CORPORATION, Tokyo (JP)

(72) Inventors: Suguru Aoki, Tokyo (JP); Taketo Akama, Tokyo (JP); Hideki Oyaizu, Tokyo (JP); Yasutaka Hirasawa, Tokyo (JP); Yuhi Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/760,412

(22) PCT Filed: Aug. 26, 2016

(86) PCT No.: PCT/JP2016/003885
§ 371 (c)(1),
(2) Date: Mar. 15, 2018

(87) PCT Pub. No.: WO2017/056385
PCT Pub. Date: Apr. 6, 2017

(65) Prior Publication Data
US 2018/0268700 A1 Sep. 20, 2018

(30) Foreign Application Priority Data
Sep. 29, 2015 (JP) .................. 2015-191190

(51) Int. Cl.
*G06F 17/10* (2006.01)
*G06G 7/78* (2006.01)
(Continued)

(52) U.S. Cl.
CPC ......... *G08G 1/166* (2013.01); *B60W 30/0956* (2013.01); *B60W 40/064* (2013.01); *B60W 50/14* (2013.01); *G06K 9/00342* (2013.01); *G06T 7/60* (2013.01); *G08G 1/16* (2013.01); *B60W 2420/42* (2013.01); *B60W 2554/00* (2020.02)

(58) Field of Classification Search
CPC ..... G08G 1/166; G08G 1/16; B60W 30/0956; B60W 40/064; B60W 50/14; G06K 9/00342; G06T 7/60; B60Q 1/00
USPC .......................... 701/301; 340/435; 382/103
See application file for complete search history.

(56) References Cited

U.S. PATENT DOCUMENTS

2006/0291694 A1* 12/2006 Venetianer ......... G06K 9/00369
382/103
2007/0222566 A1* 9/2007 Tsuji .................. G06K 9/00369
340/435

FOREIGN PATENT DOCUMENTS

DE 102007014012 A 10/2007
DE 102013207575 A1 10/2013
(Continued)

OTHER PUBLICATIONS

English Translation for JP2014067269A.*
(Continued)

*Primary Examiner* — Mahmoud S Ismail
(74) *Attorney, Agent, or Firm* — Chip Law Group

(57) ABSTRACT

An information processing apparatus according to an embodiment of the present technology includes a detection unit, an estimation unit, and a judgment unit. The detection unit detects a target object from an input image. The estimation unit estimates a posture of the detected target object. The judgment unit judges a possibility of the target object slipping on the basis of the estimated posture.

17 Claims, 15 Drawing Sheets

(51) Int. Cl.
  *G08G 1/16* (2006.01)
  *G06K 9/00* (2006.01)
  *G06T 7/60* (2017.01)
  *B60W 30/095* (2012.01)
  *B60W 40/064* (2012.01)
  *B60W 50/14* (2020.01)
  *B60Q 1/00* (2006.01)

(56) References Cited

FOREIGN PATENT DOCUMENTS

| | | |
|---|---|---|
| JP | 11-230898 A | 8/1999 |
| JP | 2005-242914 A | 9/2005 |
| JP | 2007-279808 A | 10/2007 |
| JP | 2009-122854 A | 6/2009 |
| JP | 2009122854 A * | 6/2009 |
| JP | 2010-072839 A | 4/2010 |
| JP | 4734349 B2 | 7/2011 |
| JP | 2013-232080 A | 11/2013 |
| JP | 2014-067269 A | 4/2014 |
| JP | 2014067269 A * | 4/2014 |
| WO | 2007/088859 A1 | 8/2007 |
| WO | WO-2007088859 A1 * | 8/2007 ............ B60W 40/06 |
| WO | 2016/092650 A1 | 6/2016 |
| WO | 2016/098238 A1 | 6/2016 |

OTHER PUBLICATIONS

English Translation for JP2009122854A.*
English Translation for WO2007088859A1.*
International Search Report and Written Opinion of PCT Application No. PCT/JP2016/003885, dated Nov. 29, 2016, 12 pages.

* cited by examiner

| Slipperiness of road surface | Slipperiness of posture | Final possibility of slip |
|---|---|---|
| Hard to slip | Hard to slip | Low possibility of slip |
| Hard to slip | Slippery | High possibility of slip |
| Slippery | Hard to slip | High possibility of slip |
| Slippery | Slippery | Extremely-high possibility of slip |

| Road surface state | Slipping threshold value |
|---|---|
| Dry road | High threshold value (hard to slip) |
| Wet road | Somewhat lower threshold value (somewhat slippery) |
| Snowy road | Low threshold value (slippery) |

FIG.14

IMAGE PROCESSING DEVICE AND IMAGE PROCESSING METHOD

CROSS REFERENCE TO RELATED APPLICATIONS

This application is a U.S. National Phase of International Patent Application No. PCT/JP2016/003885 filed on Aug. 26, 2016, which claims priority benefit of Japanese Patent Application No. JP 2015-191190 filed in the Japan Patent Office on Sep. 29, 2015. Each of the above-referenced applications is hereby incorporated herein by reference in its entirety.

TECHNICAL FIELD

The present technology relates to an information processing apparatus, an information processing method, and a program for raising caution of a driver when driving an automobile or the like, for example.

BACKGROUND ART

Accident avoidance technologies at emergencies, such as an automatic emergency brake and a collision avoidance system, are becoming common. Further, systems that raise caution of drivers and the like for avoiding accidents have also been developed. For example, in Patent Literature 1, a judgment is made on whether a bicycle traveling in front of own vehicle is apt to fall over on the basis of weather information and road information read out from a database. In a case where the bicycle in front is apt to fall over, a warning to that effect is made to a driver (paragraphs [0043] to [0049] etc. in specification of Patent Literature 1).

In addition, Patent Literature 2 describes a judgment apparatus capable of judging a road surface state (dry road/snowy road/wet road etc.) on the basis of reflected light from a road surface detected by a road surface sensor. In this judgment apparatus, the road surface state is judged on the basis of a signal intensity of the reflected light in addition to a reflection intensity of a horizontal polarization component and vertical polarization component of the reflected light. Accordingly, it is possible to accurately judge notify a driver of the road surface state (paragraphs [0007], [0024] to [0032], etc. in specification of Patent Literature 2).

CITATION LIST

Patent Literature

Patent Literature 1: Japanese Patent Application Laid-open No. 2009-122854
Patent Literature 2: Japanese Patent Application Laid-open No. Hei 11-230898

DISCLOSURE OF INVENTION

Technical Problem

As described above, there is a demand for a technology capable of raising caution of a driver and the like by providing effective information for preventing an accident or the like from occurring.

In view of the circumstances as described above, the present technology aims at providing an information processing apparatus, an information processing method, and a program that are capable of providing effective information so as to raise caution.

Solution to Problem

To attain the object described above, an information processing apparatus according to an embodiment of the present technology includes a detection unit, an estimation unit, and a judgment unit.

The detection unit detects a target object from an input image.

The estimation unit estimates a posture of the detected target object.

The judgment unit judges a possibility of the target object slipping on the basis of the estimated posture.

In this information processing apparatus, the possibility of the target object slipping can be judged highly accurately on the basis of the estimated posture. As a result, it becomes possible to provide effective information for preventing an accident or the like from occurring to a driver and the like so as to raise caution.

The detection unit may be capable of detecting a pedestrian from the input image. In this case, the judgment unit may judge a possibility of the pedestrian slipping on the basis of an estimated posture of the pedestrian.

Accordingly, it becomes possible to prevent an accidental contact with a pedestrian who has slipped and fallen, for example, or the like from occurring.

The detection unit may be capable of detecting a two-wheeled vehicle and a rider thereof from the input image. In this case, the estimation unit may estimate at least a posture of the rider. Further, the judgment unit may judge a possibility of the two-wheeled vehicle slipping on the basis of the estimated posture of the rider.

Accordingly, it becomes possible to prevent an accidental contact with a two-wheeled vehicle that has slipped and fallen, for example, or the like from occurring.

The estimation unit may estimate a posture of the two-wheeled vehicle. In this case, the judgment unit may judge the possibility of the two-wheeled vehicle slipping on the basis of the estimated posture of each of the two-wheeled vehicle and the rider thereof.

Accordingly, the possibility of the two-wheeled vehicle slipping can be judged highly accurately.

The judgment unit may calculate a feature point related to the target object and a contact point of the target object with a road surface on the basis of the estimated posture, and judge the possibility of a slip on the basis of an angle between a straight line connecting the feature point and the contact point and the road surface.

Accordingly, the possibility of the target object slipping can be judged highly accurately.

The feature point may be a barycenter point of the target object.

By using the barycenter point, the possibility of the target object slipping can be judged highly accurately.

The detection unit may be capable of detecting a two-wheeled vehicle and a rider thereof from the input image. In this case, the judgment unit may calculate, as the feature point, a barycenter point of the rider or an overall barycenter point of the two-wheeled vehicle and the rider thereof.

The information processing apparatus may further include an acquisition unit that acquires road surface information on a road surface state. In this case, the judgment unit may judge the possibility of a slip on the basis of the acquired road surface information.

Accordingly, the possibility of the target object slipping can be judged highly accurately.

The judgment unit may judge slipperiness of a road surface on the basis of the acquired road surface information, and judge the possibility of a slip on the basis of the judged slipperiness.

Accordingly, the possibility of the target object slipping can be judged highly accurately.

The road surface information may include a tilt angle of the road surface. In this case, the judgment unit may calculate the angle between the straight line and the road surface on the basis of the tilt angle of the road surface.

Accordingly, the possibility of the target object slipping can be judged highly accurately.

The estimation unit may estimate a framework of the detected target object.

Accordingly, the posture of the target object can be estimated highly accurately.

The information processing apparatus may be mounted on a mobile object apparatus, and the information processing apparatus may further include an output unit that generates and outputs danger avoidance information for avoiding a danger related to a drive of the mobile object apparatus on the basis of the judged possibility of a slip.

Accordingly, it becomes possible to raise caution of a driver of the mobile object apparatus and prevent an accidental contact with a pedestrian and the like from occurring.

The output unit may output an image with which the target object that has been judged as having a high possibility of slipping can be identified.

Accordingly, for example, it becomes possible to raise caution against a pedestrian who will slip and fall, or the like and prevent an accidental contact and the like from occurring.

The output unit may outputs an image including a dangerous area set for the target object that has been judged as having a high possibility of slipping.

Accordingly, it becomes possible for the driver to easily grasp a safe path or the like, for example.

An information processing method according to an embodiment of the present technology is an information processing method executed by a computer, the method including detecting a target object from an input image.

A posture of the detected target object is estimated.

A possibility of the target object slipping is judged on the basis of the estimated posture.

A program according to an embodiment of the present technology causes a computer to execute the following steps.

The step of detecting a target object from an input image.

The step of estimating a posture of the detected target object.

The step of judging a possibility of the target object slipping on the basis of the estimated posture.

Advantageous Effects of Invention

As described above, according to the present technology, it becomes possible to provide effective information to raise caution. It should be noted that the effects described herein are not necessarily limited, and any effect described in the present disclosure may be obtained.

BRIEF DESCRIPTION OF DRAWINGS

FIG. 14 An example of table information showing a relationship between a road surface state and a threshold value.

MODES FOR CARRYING OUT THE INVENTION

Hereinafter, embodiments of the present technology will be described with reference to the drawings.

First Embodiment

[Configuration of Automobile]

Figure 1:
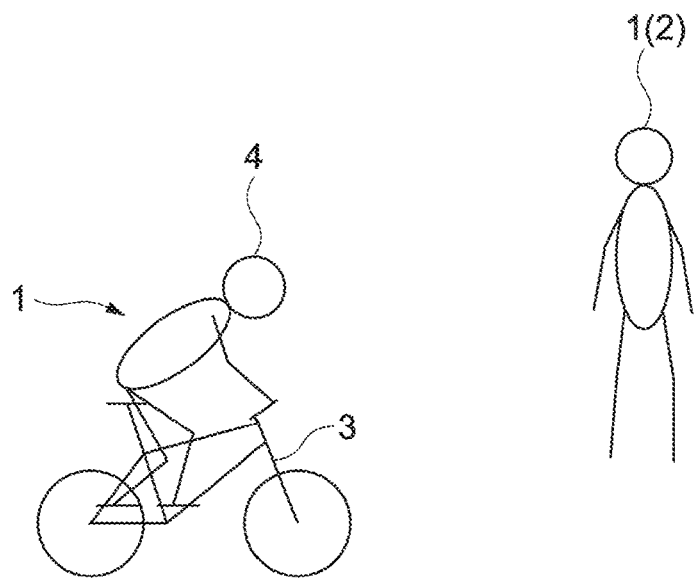
FIG. 1 An outer appearance diagram showing a configuration example of an automobile as an example of a mobile object apparatus on which a danger avoidance apparatus according to a first embodiment is mounted.
Figure 1:
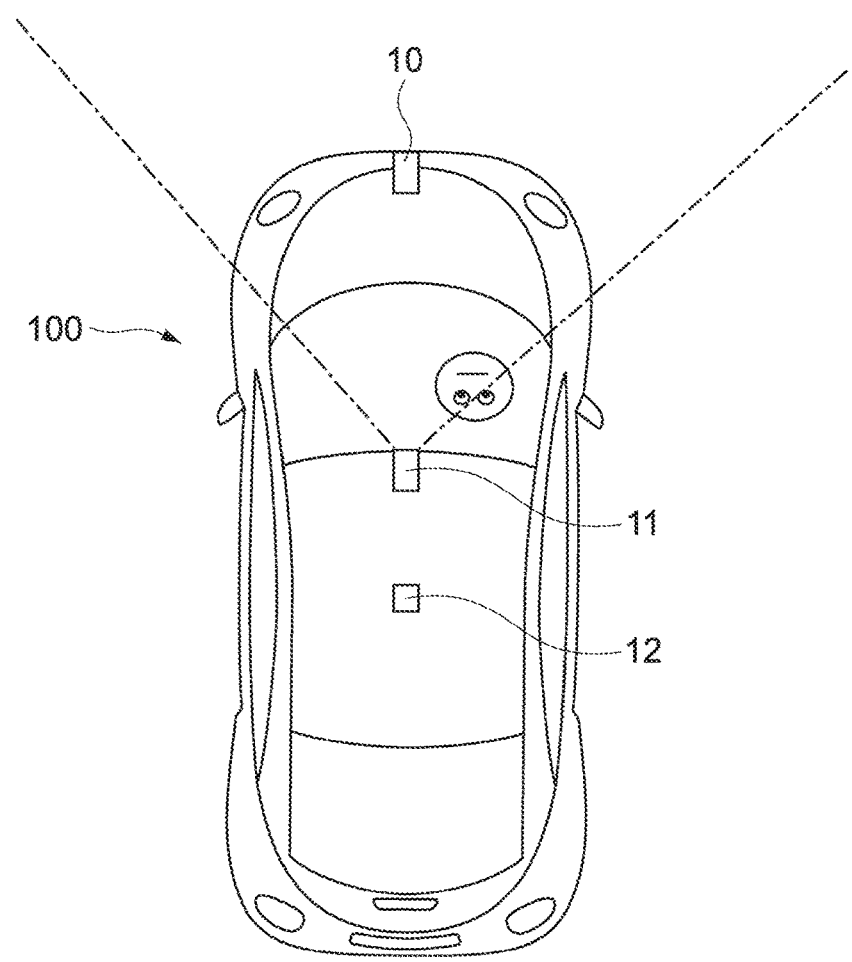
Figure 2:
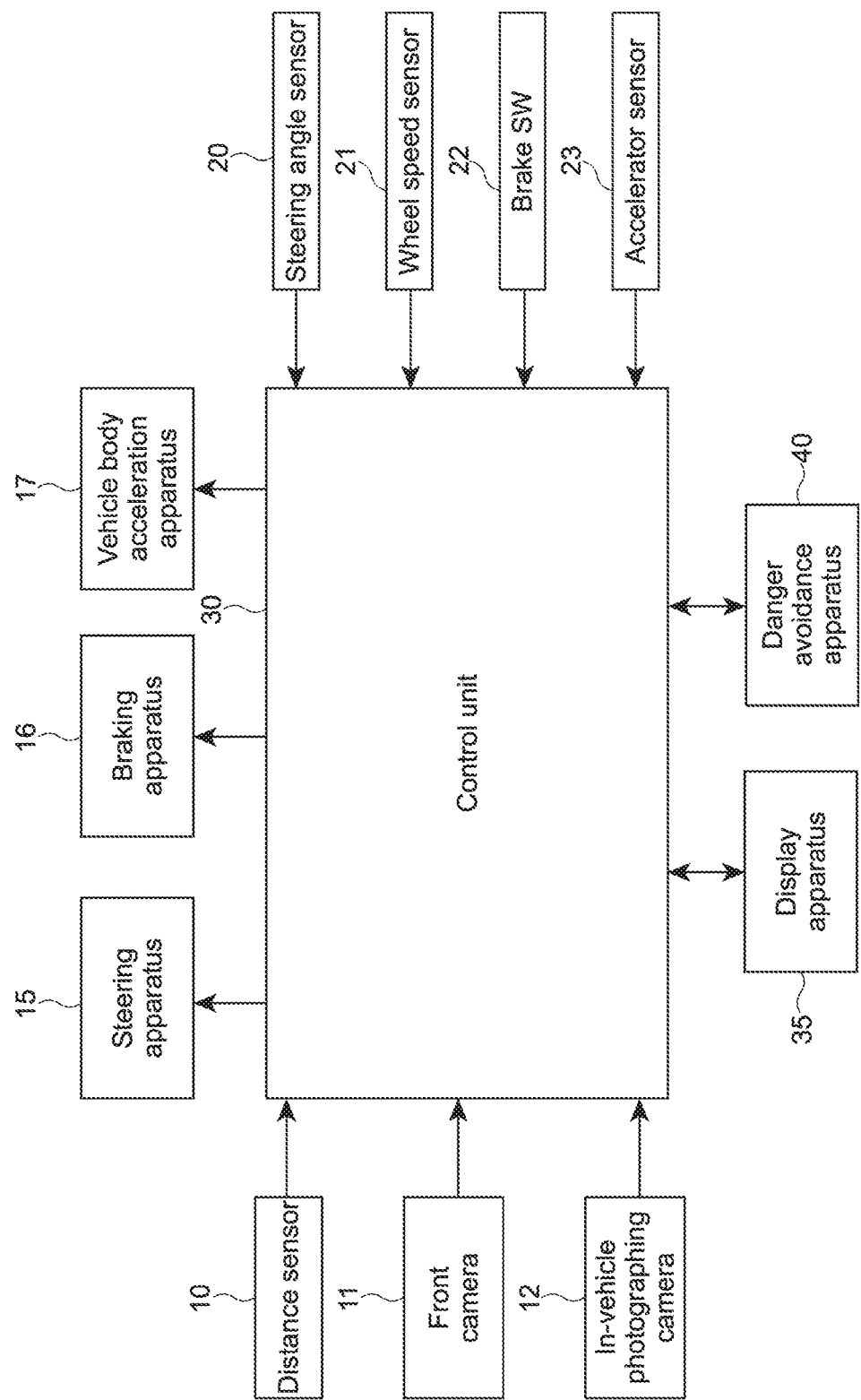
FIG. 2 A block diagram showing a configuration example of the automobile shown in FIG. 1.

FIG. 1 is an outer appearance diagram showing a configuration example of an automobile as an example of a mobile object apparatus on which a danger avoidance apparatus according to a first embodiment of the present technology is mounted. FIG. 2 is a block diagram thereof.

As shown in FIG. 1, an automobile 100 includes a distance sensor 10, a front camera 11, and an in-vehicle photographing camera 12. Further, as shown in FIG. 2, the automobile 100 includes a steering apparatus 15, a braking apparatus 16, a vehicle body acceleration apparatus 17, a steering angle sensor 20, a wheel speed sensor 21, a brake switch 22, an accelerator sensor 23, a control unit 30, a display apparatus 35, and a danger avoidance apparatus 40.

For example, the distance sensor 10 is provided at substantially the center of a front portion of the automobile 100, and detects information on a distance between the automobile 100 and an object present in a movement direction thereof. The distance sensor 10 includes various sensors that use a millimeter wave radar, infrared laser, and the like, for example.

The front camera 11 is provided in a cabin or roof portion of the automobile 100, for example, and photographs a front view of the automobile 100 at a predetermined frame rate. The photographed image photographed by the front camera 11 is output to the danger avoidance apparatus 40 via the control unit 30, and a possibility of a slip of a target object present in front of own vehicle is judged. For example, the front camera 11 includes an image sensor that uses a CMOS, a CCD, or the like.

As shown in FIG. 1, in this embodiment, a pedestrian 2, a bicycle 3, and a rider 4 thereof will be exemplified as the target object 1. In addition, the present technology is also applicable to riders of other two-wheeled vehicles such as a motorcycle, an auto three-wheeled vehicle, and the like.

The in-vehicle photographing camera 12 is provided in the cabin of the automobile 100 and photographs am inside of the cabin at a predetermined frame rate. A presence or absence of a passenger, a sitting position thereof, and the like, for example, can be judged by the image photographed by the in-vehicle photographing camera 12.

It should be noted that the distance sensor 10, the front camera 11, and the in-vehicle photographing camera 12 may be configured such that outputs thereof are supplied to the danger avoidance apparatus 40 instead of the control unit 30 as shown in FIG. 2.

The steering apparatus 15 is typically constituted of a power steering apparatus and transmits a steering operation of the driver to steered wheels. The braking apparatus 16 includes a brake actuator attached to each wheel and a hydraulic circuit for actuating the brake actuators, and controls a braking force of each of the wheels. The vehicle body acceleration apparatus 17 includes a throttle valve, a fuel injection apparatus, and the like, and controls a rotational acceleration of drive wheels.

The control unit 30 controls operations of the respective mechanisms mounted on the automobile 100. For example, the control unit 30 controls brake, steer, acceleration, and the like of the automobile 100 on the basis of operations of the driver using a steering wheel, an accelerator, and the like. For example, the control unit 30 detects a steering amount and a steering direction on the basis of an output of the steering angle sensor 20 that detects a steering operation of the driver, to thus control the steering apparatus 15.

Further, the control unit 30 calculates a vehicle body speed of the vehicle on the basis of an output of the wheel speed sensor 21 provided on all the wheels or a part of the wheels, and controls the braking apparatus 16 such that locking (slipping) of the wheels is prevented from occurring. Furthermore, the control unit 30 controls the vehicle body acceleration apparatus 17 on the basis of an output of the accelerator sensor 23 that detects an accelerator pedal operation amount of the driver.

The brake switch 22 is used for detecting a brake operation (depression of brake pedal) of the driver and is referenced in performing ABS control or the like.

The control unit 30 may control the steering apparatus 15, the braking apparatus 16, and the vehicle body acceleration apparatus 17 individually, as well as cooperatively control a plurality of them. As a result, it becomes possible to control the automobile 100 to a desired posture during steering (turning), braking, acceleration, and the like.

Further, the control unit 30 is configured to be capable of controlling the steering apparatus 15, the braking apparatus 16, and the vehicle body acceleration apparatus 17 irrespective of the various operations of the driver described above. For example, the automobile 100 may include an automatic driving function. In this case, the control unit 30 subjectively controls the respective apparatuses on the basis of the outputs of the respective sensors and cameras.

The display apparatus 35 includes a display unit that uses liquid crystal, EL (Electro-Luminescence), or the like, for example, and displays map information, navigation information, and the like on the display unit. Further, the display apparatus 35 displays a danger avoidance image output from the danger avoidance apparatus 35. Typically, a car navigation apparatus is used as the display apparatus 35. Further, an apparatus that causes an AR (Augmented Reality) image to be displayed at a predetermined position of a windshield or the like may also be used.

As will be described later in detail, the danger avoidance apparatus 40 detects the target object 1 from an image photographed by the front camera 11 and judges a possibility of the target object 1 slipping with respect to a road surface. The possibility of the target object 1 slipping is a possibility of a part of the target object 1 in contact with the road surface slipping along the road surface. In other words, it is possible to calculate, by the danger avoidance apparatus 40, a possibility of the pedestrian 2 slipping his/her foot or a possibility of a wheel of the bicycle 3 slipping.

The danger avoidance apparatus 40 corresponds to an information processing apparatus according to this embodiment and includes hardware requisite for a computer, such as a CPU, a RAM, and a ROM, for example. A danger avoidance method (information processing method) according to the present technology is executed by the CPU loading a program according to the present technology, that is recorded in advance in the ROM, to the RAM and executing it.

A specific configuration of the danger avoidance apparatus 40 is not limited, and PLD (Programmable Logic Device) such as FPGA (Field Programmable Gate Array) and other devices such as ASIC (Application Specific Integrated Circuit) may also be used. Further, the danger avoidance apparatus 40 may be configured as a part of the control unit 30.

Figure 3:
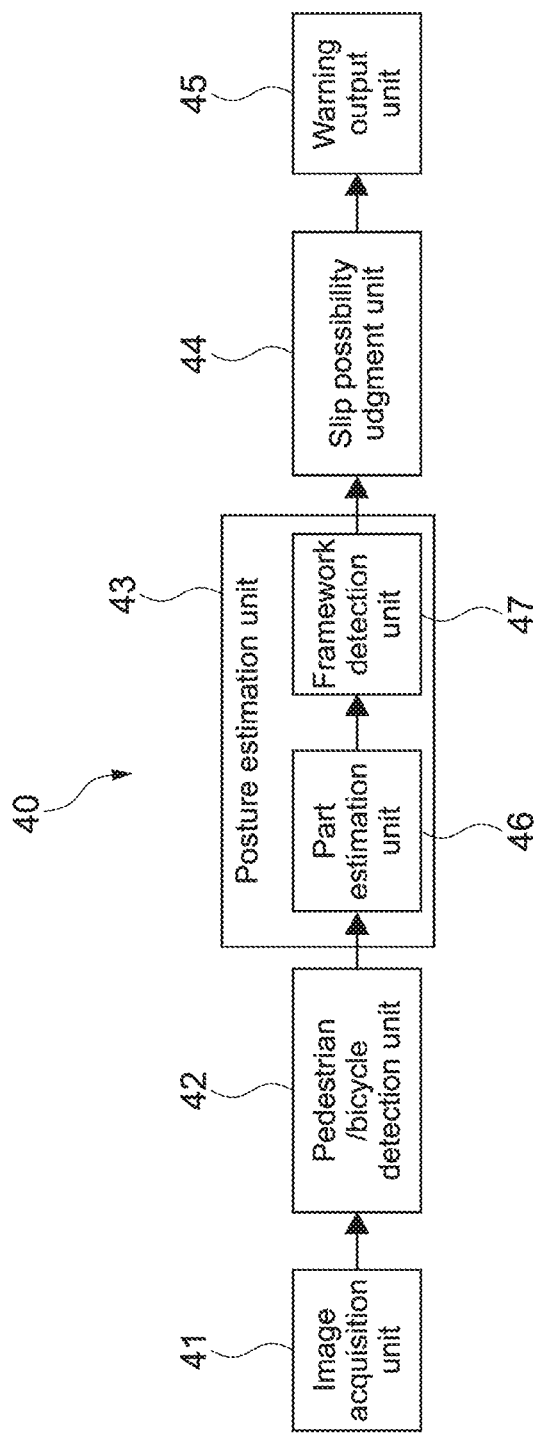
FIG. 3 A block diagram showing a functional configuration example of the danger avoidance apparatus.

FIG. 3 is a block diagram showing a functional configuration example of the danger avoidance apparatus 40. The danger avoidance apparatus 40 includes an image acquisition unit 41, an object detection unit 42, a posture estimation unit 43, a possibility judgment unit 44, and a warning output unit 45. For example, the CPU of the danger avoidance apparatus 40 executes a predetermined program so as to configure each of the functional blocks.

The image acquisition unit 41 acquires an image photographed by the front camera 11 (hereinafter, this image will be referred to as input image). The object detection unit 42 detects each of the pedestrian 2, the bicycle 3, and the rider 4 thereof from the input image. The detection of the pedestrian 2 and the bicycle 3 may be performed by an arbitrary image analysis technology such as template matching and image scanning.

The posture estimation unit 43 estimates postures of the detected pedestrian 2 and the rider 4. The posture estimation unit 43 includes a part estimation unit 46 and a framework detection unit 47. In other words, in this embodiment, the postures are judged on the basis of framework positions of the pedestrian 2 and the rider 4.

Figure 4:
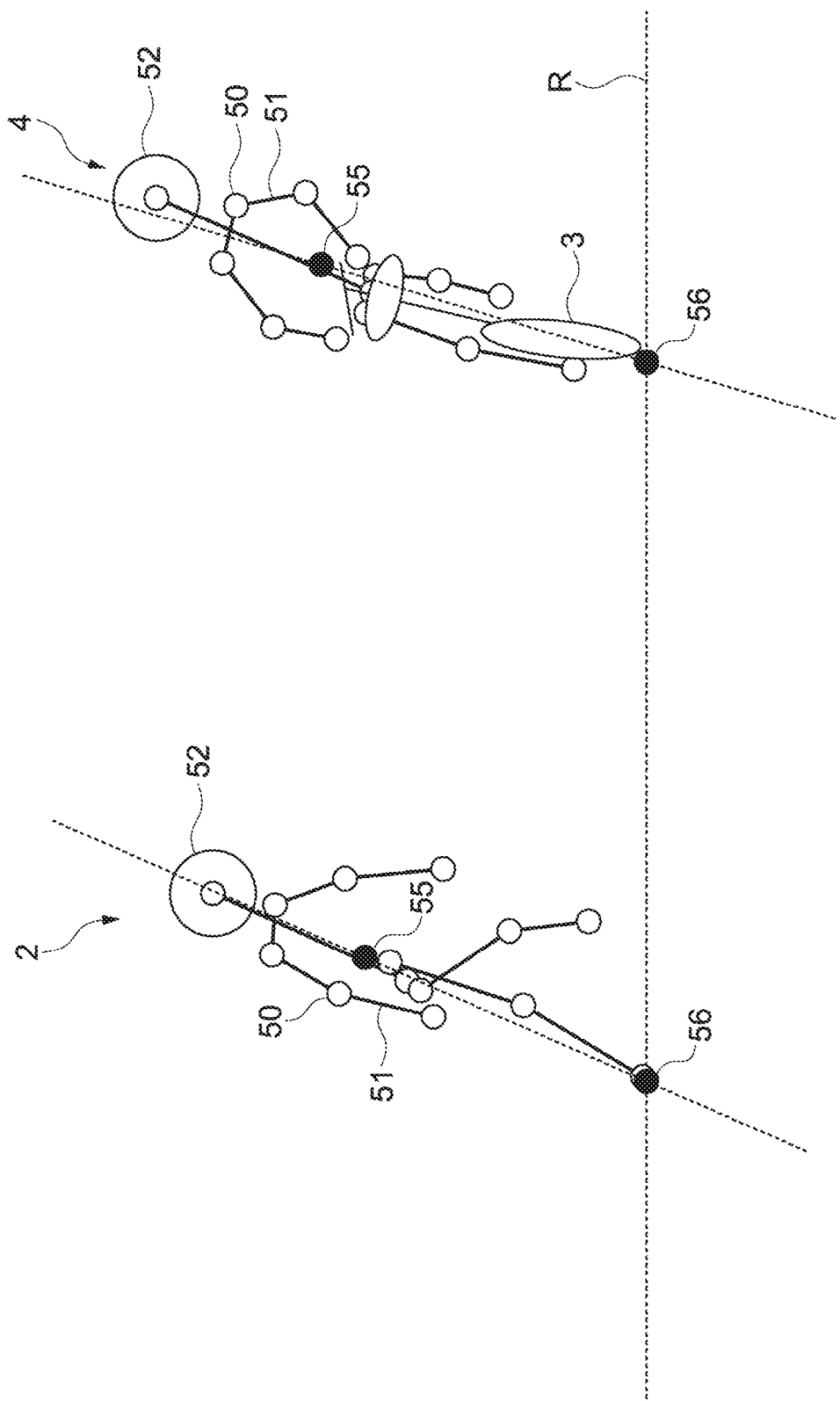
FIG. 4 A diagram for explaining an example of a framework estimation.

FIG. 4 is a diagram for explaining an example of the framework estimation. The framework of each of the pedestrian 2 and the rider 4 is expressed by white circles 50, lines 51 connecting them, and a head portion 52 in FIG. 4. In FIG. 4, a barycenter point 55 of each of the pedestrian 2 and the rider 4 and grounding points 56 of the pedestrian 2 and the bicycle 3 with a road surface R are shown. These points are used for judging the possibility of a slip.

The framework estimation is also called bone estimation or skeleton estimation and can be executed using a well-known technology. Describing an example thereof with reference to the pedestrian 2, first, a model of a framework to be calculated, that is, a model of the positions and number of white circles 50, the lines 51 connecting them, and the like shown in FIG. 4 are preset.

The framework model is typically set in accordance with an actual framework of a human body. For example, a plurality of main parts such as a head, thigh, and waist are set, and the white circles 50 are set at barycenter points of the parts and joint portions of the parts. Further, the lines 51 connecting the white circles 50 are set on the basis of the positions of the parts.

On the basis of the image (partial image) of the pedestrian 2 in the input image, the part estimation unit 46 calculates the position of each part set as described above with respect to the pedestrian 2 in the input image. For example, images of each part in various postures are stored as template images. By matching these template images with the image of the pedestrian 2, the position of each part of the pedestrian 2 can be calculated.

The framework detection unit 47 sets the white circles 50, the lines 51, and the head portion 52 on the basis of the calculated position of each part, and thus the framework of the pedestrian 2 is detected.

It should be noted that it is also possible to mount a depth sensor on a front portion of the automobile 100 and estimate the position of each part using parameters obtained by machine learning on the basis of a depth image (distance image) of the pedestrian 2 obtained by the depth sensor. For example, one pixel in the image of the pedestrian 2 is selected, and depth information (distance information) of a predetermined area including the pixel is acquired. On the basis of this depth information, a judgment is made on which part the selected pixel is included in using the parameters described above. By executing the same processing for each pixel in the image of the pedestrian 2, the position of each part of the pedestrian 2 can be calculated. Accordingly, the framework of the pedestrian 2 is estimated.

Instead of the depth information, RGB information of a pixel may be used. Specifically, it is possible to judge a part including a selected pixel using parameters obtained by machine learning on the basis of peripheral RGB information of the selected pixel. In addition, the framework estimation may be executed by an arbitrary technology such as a method that uses a stereo camera. It should be noted that the framework of the rider 4 of the bicycle 3 can also be similarly estimated.

The possibility judgment unit 44 judges the possibilities of a slip of the pedestrian 2 and the bicycle 3 from the estimated postures, that is, the frameworks shown in FIG. 4. Particularly in this embodiment, the possibility of a slip is judged on the basis of a posture of the rider 4 regarding the bicycle 3 and the rider 4 thereof that have been detected as the target object 1. Hereinafter, the bicycle 3 and the rider 4 thereof as the target object 1 may be described while referring to only one of the bicycle 3 and the rider 4 thereof. For example, the postures of the bicycle 3 and the rider 4 thereof may be described as posture of the bicycle 3.

The warning output unit 45 outputs danger avoidance information for avoiding a danger concerning the drive of the automobile 100 on the basis of the judged possibility of a slip. Typically, information is output for avoiding a situation where, in a case where the pedestrian 2 or the bicycle 3 slips and falls, the automobile 100 comes into accidental contact with the pedestrian 2 or the bicycle 3 and the rider 4 thereof. The danger avoidance information is output by, for example, an image, audio, or the like.

[Slip Possibility Judgment Operation]

Figure 5:
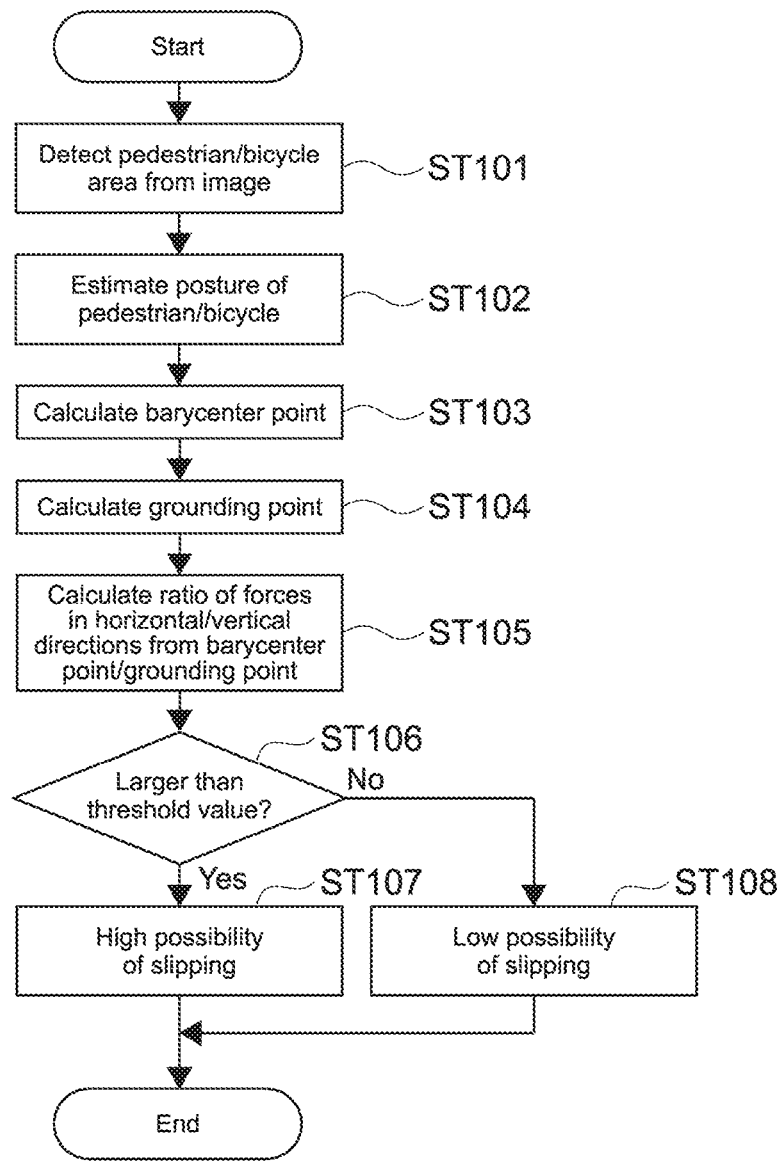
FIG. 5 A flowchart showing an example of a slip possibility judgment operation.

FIG. 5 is a flowchart showing an example of a slip possibility judgment operation. First, the object detection unit 42 detects each of the pedestrian 2 and the bicycle 3 (Step 101). Next, the posture estimation unit 43 estimates a posture of each of the pedestrian 2 and the bicycle 3 (Step 102). Subsequently, the possibility judgment unit 44 judges a possibility of a slip based on the estimated posture.

For example, if the posture is tilted, there is a possibility that a lateral force along the road surface R will be applied to the grounding point 56 with the road surface R to thus cause a slip. Therefore, it is judged that there is a possibility of a slip when focusing on the lateral force that acts on the grounding point 56. As will be described later, in this embodiment, the road surface R is assumed to be spreading in the horizontal direction. Therefore, the lateral force that acts on the grounding point 56 is a horizontal force.

Figure 6:
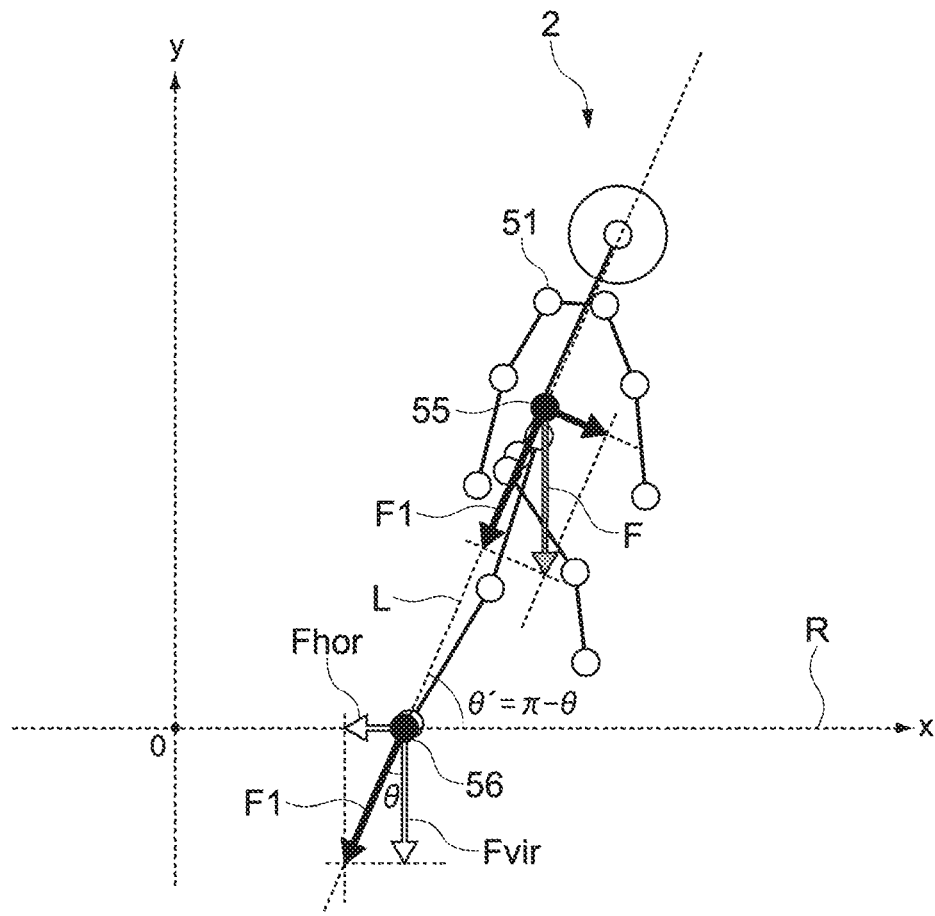
FIG. 6 A diagram for explaining an example of a slip possibility judgment method.

FIG. 6 is a diagram for explaining an example of a slip possibility judgment method. First, the barycenter point 55 of the pedestrian 2 is calculated as a feature point related to the pedestrian 2 (Step 103). Coordinates ($x_{ave}$, $y_{ave}$) of the barycenter point 55 are calculated by the following expressions.

$$x_{ave} = \frac{\Sigma_{i=1,\ldots,N}(W_i \cdot x_i)}{W}$$ [Expression 1]

$$y_{ave} = \frac{\Sigma_{i=1,\ldots,N}(W_i \cdot y_i)}{W}$$

It should be noted that the parameters are as follows.
N . . . Number of set parts
Wi . . . Mass of each part
(xi, yi) . . . Positional coordinates of each part
W . . . Total mass of pedestrian (=$W_1$+ . . . +$W_N$)

The mass Wi of each part and the total mass W are preset. For example, an average mass of each part of a human body is used. It should be noted that it is also possible to distinguish males, females, adults, children, and the like from one another and store each of the masses of the respective parts. For example, a type of the pedestrian 2 is judged from an input image, and a mass of each corresponding part is read out.

The positional coordinates of each part are calculated on the basis of a position of the part estimated by the posture estimation, and a position of the barycenter point of each part is typically used. It should be noted that the positional coordinates of each part may be calculated on the basis of positional coordinates of the white circles 51 expressing the framework. For example, a center point of the white circles 51 at joint portions at both ends of a part may be used as the positional coordinates of the part.

The contact point of the pedestrian 2 with the road surface R, that is, the grounding point 56 (coordinates ($x_{ground}$, $y_{ground}$)) is calculated (Step 104). In this embodiment, a lowermost point of the estimated framework is calculated as the grounding point 56. Further, the possibility of a slip is judged assuming that the road surface R extends in the horizontal direction (x-axis direction).

It should be noted that in this embodiment, it is judged as not slipping in a case where both feet are on the road surface R. Therefore, the judgment on the possibility of a slip is executed for the pedestrian 2 having only one foot on the road surface R. Instead of this, for example, the possibility of a slip in a case where the pedestrian 2 is standing on both feet may be judged using a center point of each grounding point of both feet as the grounding points 56 of the pedestrian 2.

It should be noted that regarding the rider 4 of the bicycle 3, lowermost points of the wheels of the bicycle 3 becomes the grounding points 56 (see FIG. 4). The lowermost points can be calculated on the basis of, for example, an image of the bicycle 3 detected from the input image.

A force $F_{hor}$ in the horizontal direction (x-axis direction) and a force $F_{vir}$ in the vertical direction (Y-axis direction), that act on the grounding point 56, are calculated by the following expressions.

$$F_{hor} = W \cdot G \cdot \cos\theta \cdot \sin\theta$$

$$F_{vir} = W \cdot G \cdot \cos\theta \cdot \cos\theta \quad \text{[Expression 2]}$$

Assuming that G represents a gravitational acceleration, a force F in the vertical direction that acts on the barycenter point 55, F=WG is established. Assuming that a component force of this force F, that acts in an extension direction of a straight line L connecting the barycenter point 55 and the grounding point 56, is F1, F1=WG cos θ is established. Component forces of this force F1 in the horizontal/vertical directions become the force $F_{hor}$ and the force $F_{vir}$ described above.

An angle θ is calculated by the following expression using the coordinates ($x_{ave}$, $y_{ave}$) of the center point 55 and the coordinates ($x_{ground}$, $y_{ground}$) of the grounding point 56.

$$\theta = \tan^{-1}\left(\frac{|x_{ave} - x_{ground}|}{y_{ave}}\right) \quad \text{[Expression 3]}$$

In general, in a case where a force in the horizontal direction is applied to an object that is still on a horizontal surface, a condition for the object to move is that the force becomes larger than normal force*static friction coefficient. In other words, horizontal force/normal force needs to become larger than the static friction coefficient. Focusing on this point, in this embodiment, $F_{hor}/F_{vir}$ is calculated as a force ratio (Step 105) as shown in the following expression.

$$\text{Rate} = \frac{F_{hor}}{F_{vir}} = \tan\theta \quad \text{[Expression 4]}$$

A judgment is made on whether the calculated force ratio=tan θ is larger than a predetermined threshold value (Step 106). In a case where the force ratio is larger than the threshold value (Yes in Step 106), the pedestrian 2 and the bicycle 3 are judged as having a high possibility of slipping (Step 107). In a case where the force ratio is smaller than the threshold value (No in Step 106), the pedestrian 2 and the bicycle 3 are judged as having a low possibility of slipping (Step 108).

The threshold value is set by verifying a slippery posture in actuality in various road surface states such as a dry road, a snowy road, and a wet road, for example. An average value of values calculated in the respective road surface states may be used, or a calculated value in a most slippery road surface state may be used. In calculating the threshold value, a static friction coefficient and a dynamic friction coefficient in each road surface state may be referenced. In addition, a threshold value calculation method may be set arbitrarily. For example, it is also possible to calculate the threshold value by machine learning or the like on the basis of data obtained by an experiment or simulation.

In addition, different threshold values may be set for a case where a slip possibility judgment target is a pedestrian and a case where it is a bicycle. For example, different threshold values may be calculated while focusing on a difference in average movement speeds, a difference in heights of barycenter points, a difference in total weights, and the like.

As can be seen from the force ratio=tan θ, if the angle θ is calculated, the possibility of a slip can be judged. The possibility of a slip can be judged on the basis of the angle θ of the straight line L connecting the barycenter point 55 and the grounding point 56 with respect to the vertical direction. Here, assuming that an angle of the straight line L connecting the barycenter point 55 and the grounding point 56 with respect to the road surface R is θ', θ'=π−θ is established. Therefore, it is also possible to judge the possibility of a slip by calculating the angle θ'.

By focusing on the barycenter point 55 and the grounding point 56 of the target object 1, it is possible to highly accurately judge the possibility of the target object 1 slipping. It should be noted that a stepwise evaluation may be carried out regarding the possibility of a slip. Specifically, the possibility of a slip may be judged by a plurality of steps like the possibility is extremely low, low, normal, high, extremely high, and the like.

Figure 7:
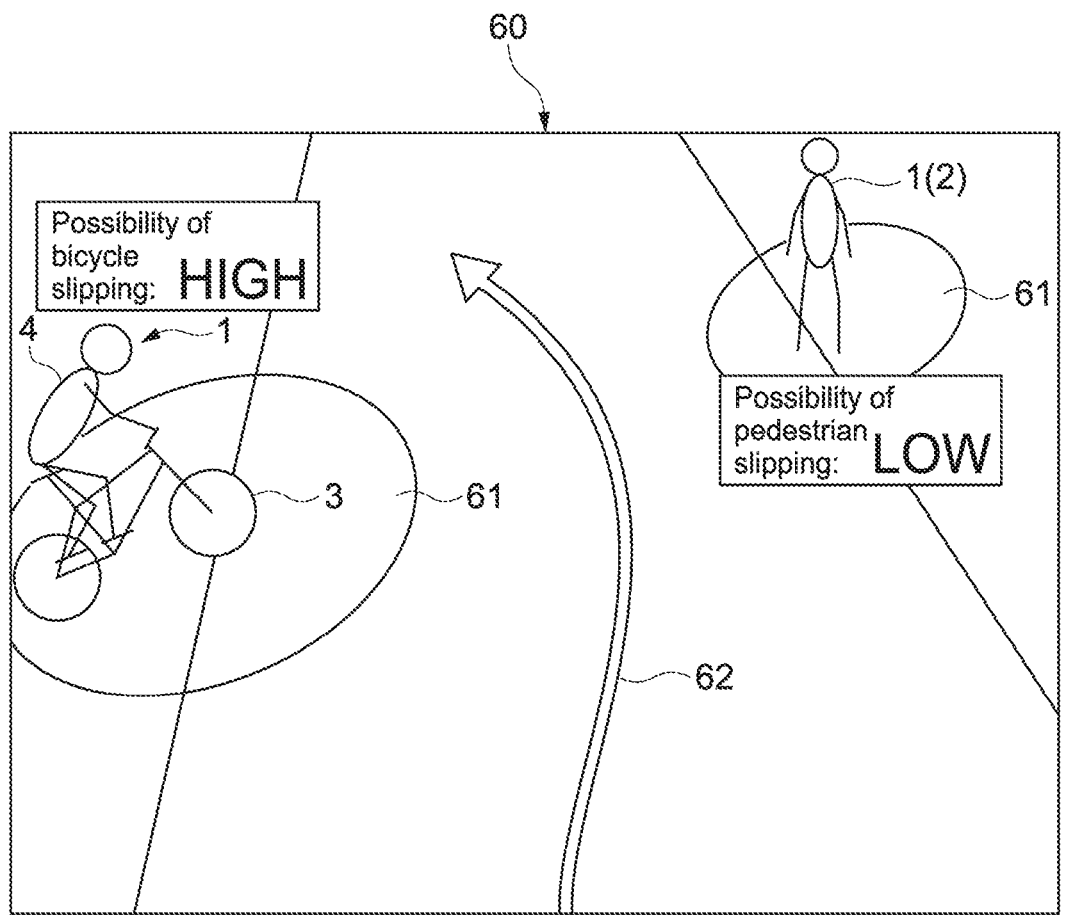
FIG. 7 A diagram showing an example of a danger avoidance image output by a warning output unit.

FIG. 7 is a diagram showing an example of a danger avoidance image as danger avoidance information output by the warning output unit 45. The danger avoidance image 60 is an image with which at least the pedestrian 2 or the bicycle 3, that has been judged as having a high possibility of slipping, can be identified. In the example shown in FIG. 7, a type of each target object 1 (pedestrian 2/bicycle 3), a level of the possibility of a slip, a dangerous area 61 set for each target object 1, and a danger avoidance path 62 are displayed.

The dangerous area 61 is an area where there is a possibility that the pedestrian 2 or the like will enter when the pedestrian 2 or the bicycle 3 slips and falls over. For example, a size of the dangerous area 61 is preset for each pedestrian 2 and bicycle 3, and the dangerous area 61 is set about the pedestrian 2 and the like. Alternatively, the dangerous area 61 may be dynamically set on the basis of a movement direction and movement speed of the pedestrian 2 and the bicycle 3. It should be noted that in the example shown in FIG. 7, the dangerous area 61 is also displayed for the pedestrian 2 having a low possibility of slipping, but the dangerous area 61 may be displayed only for the target object 1 having a high possibility of slipping.

The danger avoidance path 62 is an image that shows a route for avoiding the dangerous area 61 set for each target object 1. For example, a prediction path of own vehicle is calculated from a current traveling operation of own vehicle, and the danger avoidance path 62 is calculated using the prediction path as a reference. Alternatively, for example, the danger avoidance path 62 may be calculated using a path preset on the basis of navigation information and the like as a reference. Further, road information, map information, and the like may be used as appropriate.

By displaying the danger avoidance image 60, it becomes possible to cause the driver of the automobile 100 to pay attention to the pedestrian 2 or the like having a high possibility of slipping to fall over, and prevent an accidental contact and the like from occurring with the fallen pedestrian 2 or the like. Further, by displaying the dangerous area 61 and the danger avoidance path 62, the driver can easily grasp a safe path and the like. It should be noted that the driver may be notified of the possibility of a slip of each target object 1, the danger avoidance path 62, and the like by audio.

As described above, in the danger avoidance apparatus 40 of this embodiment, the possibilities of the pedestrian 2 and the bicycle 3 slipping can be highly accurately judged on the basis of the estimated postures. Accordingly, it becomes possible to provide effective danger avoidance information for preventing an accident and the like to the driver of the automobile 100 and the like and thus raise caution. As a result, an accidental contact or the like with the pedestrian 2 or the rider 4 of the bicycle 3, who has slipped and fallen, can be prevented from occurring.

Second Embodiment

A danger avoidance apparatus according to a second embodiment of the present technology will be described. In descriptions below, descriptions on configurations and operations similar to those of the automobile 100 and danger avoidance apparatus 40 described in the above embodiment will be omitted or simplified.

In this embodiment, not only the posture of the target object but also road surface information on a road surface state is used to judge the possibility of the target object slipping. The road surface information is acquired from a road surface sensor installed in an automobile on which the danger avoidance apparatus is mounted.

The road surface sensor is installed below a front portion of the automobile, for example. In this embodiment, a polarization camera is used as the road surface sensor, and a horizontal polarization image and vertical polarization image of a road surface are generated. The generated horizontal polarization image and vertical polarization image are output to the danger avoidance apparatus, and the road surface state is detected on the basis of an intensity of each polarization image.

In this embodiment, a dry road is detected as a hard-to-slip road surface state. As a slippery road surface state, a wet road and a snowy road are detected. In other words, in this embodiment, three types of road surface states can be detected, and in a case where none of the road surface states is detected, the road surface state is judged as unknown. It should be noted that the types of detectable road surface states are not limited, and a frozen state or the like may also be detected, for example. Alternatively, substances (materials, fabrics) configuring road surfaces, such as asphalt and soil, may also be detected.

A method of detecting a road surface state is not limited, and a road surface state may be detected on the basis of color information of a photographed image obtained by photographing a road surface, for example. Alternatively, a depth sensor, a stereo camera, or the like may be used.

Figure 8:
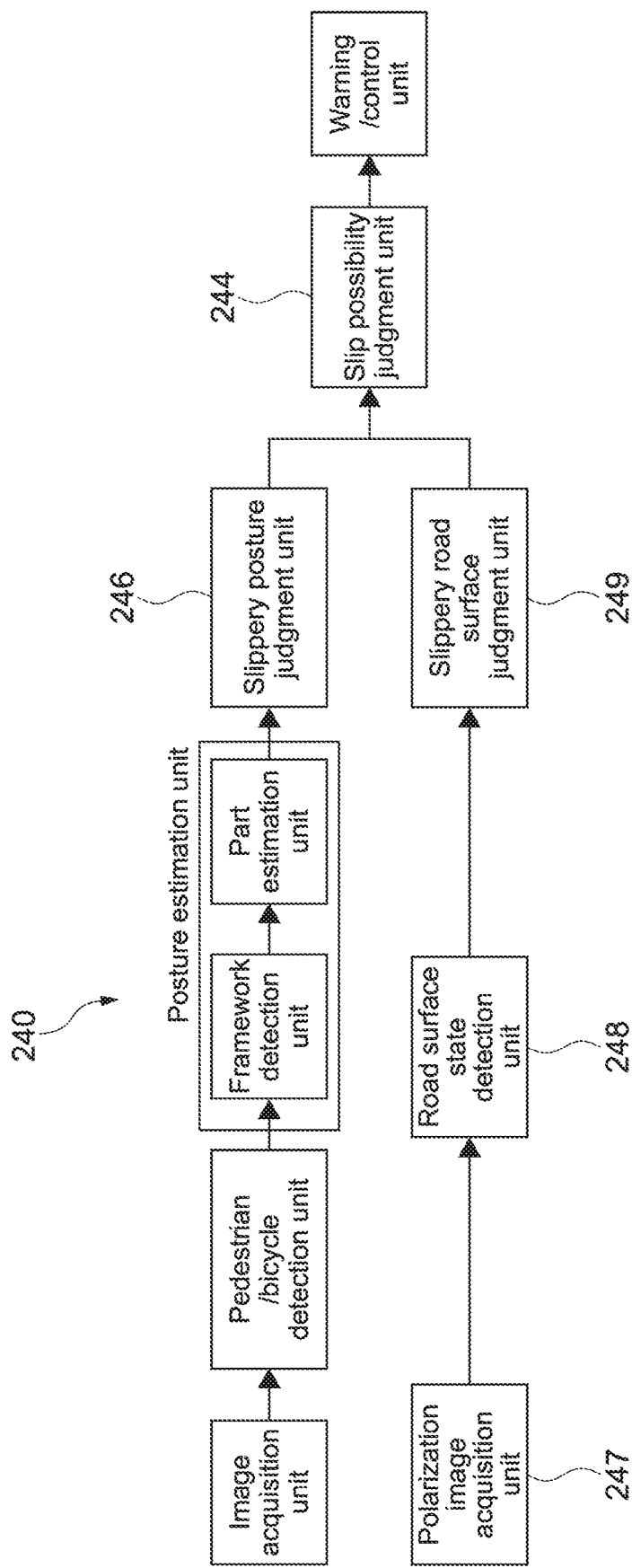
FIG. 8 A block diagram showing a functional configuration example of a danger avoidance apparatus according to a second embodiment.
Figure 9:
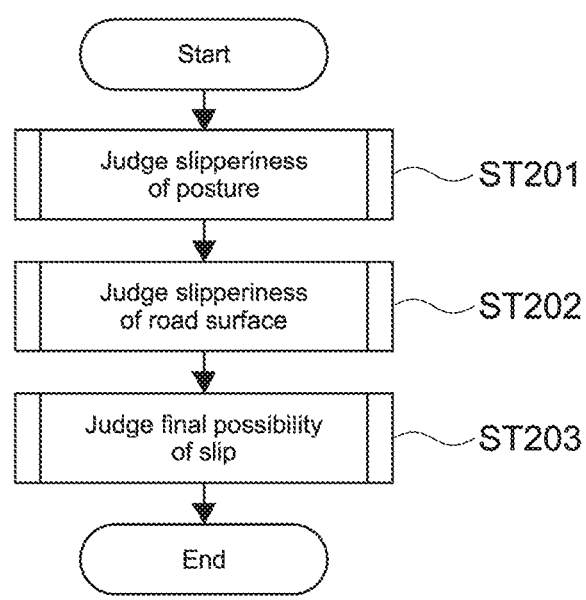
FIG. 9 A flowchart showing an example of a slip possibility judgment operation according to the second embodiment.

FIG. 8 is a block diagram showing a functional configuration example of the danger avoidance apparatus. FIG. 9 is a flowchart showing an example of a slip possibility judgment operation. A danger avoidance apparatus 240 according to this embodiment includes a posture judgment unit 246, a polarization image acquisition unit 247, a road surface state detection unit 248, and a road surface judgment unit 249.

First, the posture judgment unit 246 judges whether the target object is in a slippery posture (Step 201). This judgment is executed on the basis of an estimated posture of the target object. Specifically, substantially the same processing as the processing shown in FIG. 5 described in the first embodiment is executed.

In a case where it is judged that the possibility of a slip is high in Step 107 of FIG. 5, it is judged that the target object is in a slippery posture. In a case where it is judged that the possibility of a slip is low in Step 108 of FIG. 5, it is judged that the target object is not in a slippery posture.

Figure 10:
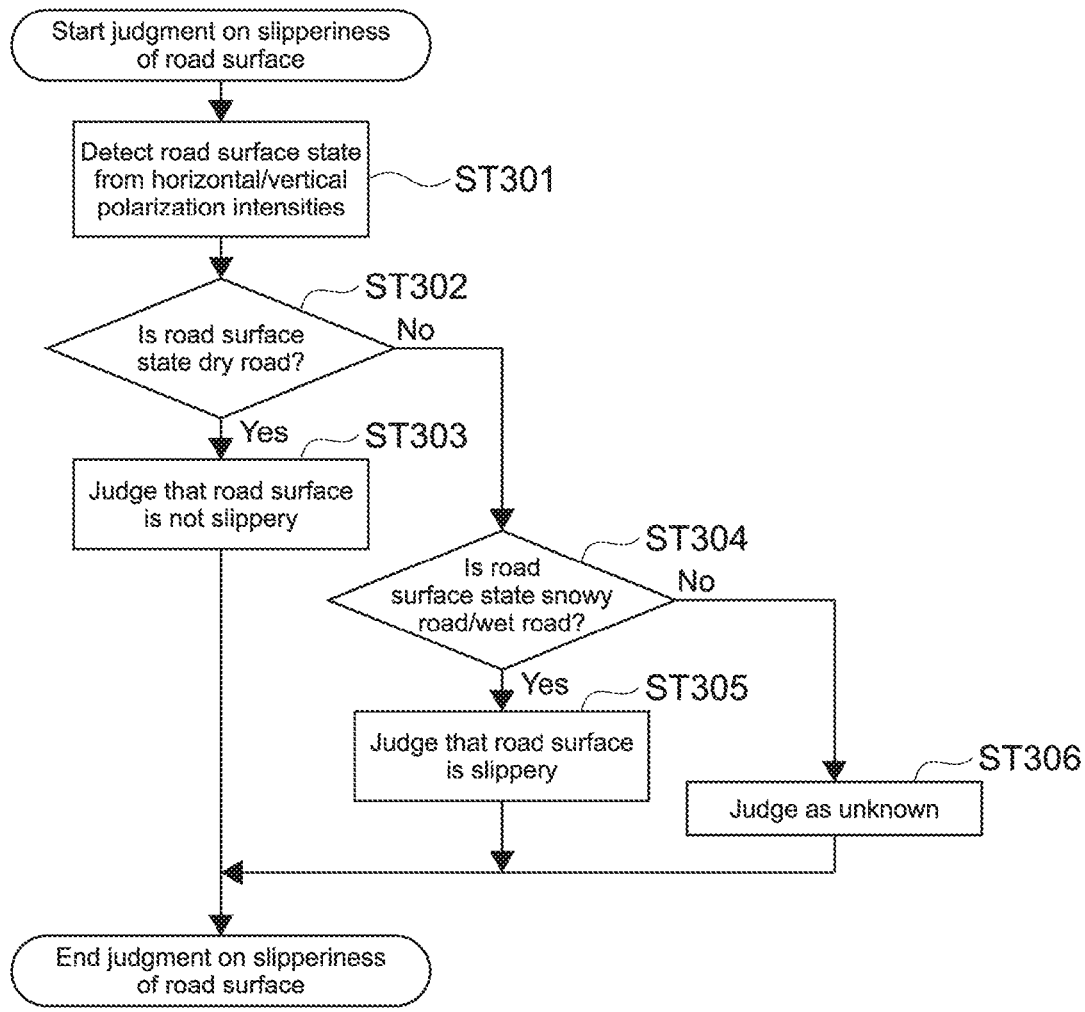
FIG. 10 A flowchart showing an example of a judgment on slipperiness of a road surface.

Next, slipperiness of the road surface is judged (Step 202). FIG. 10 is a flowchart showing an example of the judgment on slipperiness of a road surface. A horizontal polarization image and vertical polarization image of the road surface are acquired by the polarization image acquisition unit 247. Then, the road surface state detection unit 248 detects a road surface state on the basis of an intensity of each polarization image (Step 301). The polarization image acquisition unit 247 and the road surface state detection unit 248 correspond to an acquisition unit according to this embodiment.

The road surface judgment unit 249 judges whether the road surface is slippery. Specifically, it is judged whether the road surface state is a dry road (Step 302). In the case of Yes, it is judged that the road surface is not slippery (Step 303).

When the road surface state is not a dry road (No in Step 302), it is judged whether the road surface state is either a snowy road or a wet road (Step 304). In a case where the road surface state is a snowy road or a wet road, it is judged that the road surface is slippery (Step 305). In a case where the road surface state does not correspond to either the snowy road or the wet road, the road surface state is judged as unknown (Step 306).

On the basis of the slipperiness of the posture and the slipperiness of the road surface, a possibility judgment unit 244 judges a final possibility of a slip of the target object (Step 203 of FIG. 9).

Figures 11, 12:
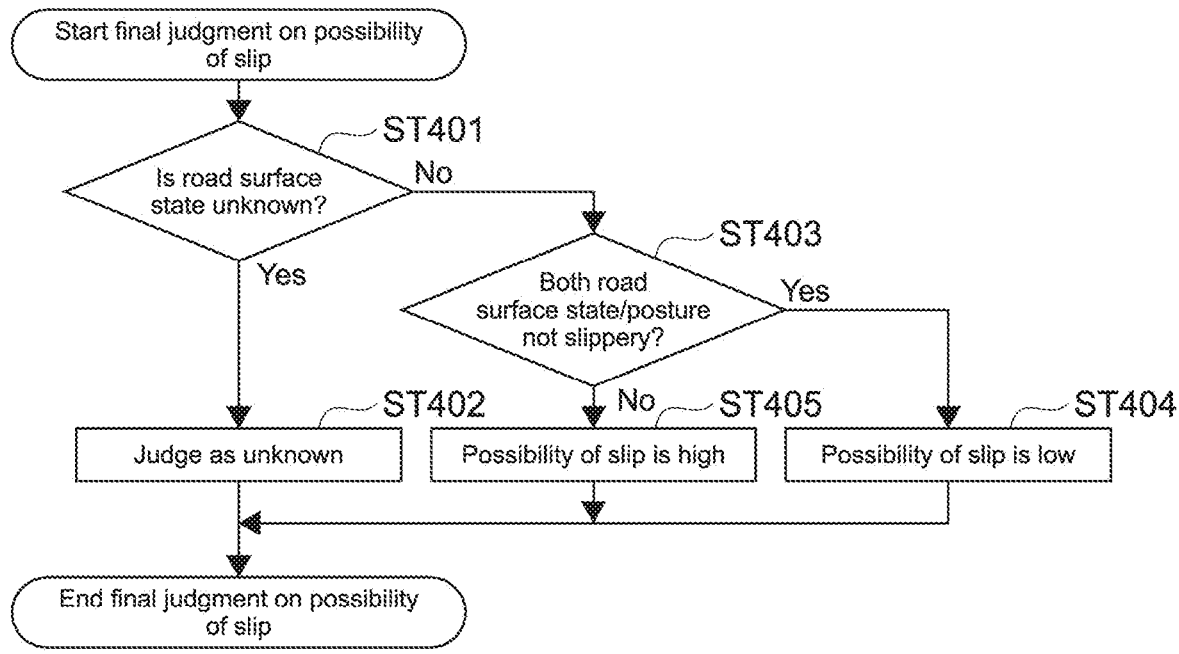
FIG. 11 A flowchart showing an example of a final slip possibility judgment operation.
FIG. 12 An example of table information that can be referenced during the processing shown in FIG. 11.

FIG. 11 is a flowchart showing an example of a final judgment operation on the possibility of a slip. First, it is judged whether the road surface state is unknown (Step 401), and in the case of Yes, it is judged that the possibility of a slip is unknown (Step 402). Alternatively, substantially similar to the first embodiment, the slipperiness of the posture may be judged as it is as the final possibility of a slip.

When the road surface state is not unknown (No in Step 401), it is judged whether both the road surface state and the posture are hard to slip. In other words, it is judged whether the road surface is a road surface that is hard to slip and the posture is a posture that is hard to slip (Step 403). When both the road surface state and the posture are hard to slip (Yes in Step 403), it is judged that the possibility of the target object slipping is low (Step 404).

In a case where the road surface state and the posture do not correspond to a case where both are not slippery, that is, at least one of the road surface state and the posture is slippery (No in Step 403), it is judged that the possibility of the target object slipping is high (Step 405).

The judgment processing shown in FIG. 11 may be executed on the basis of table information as shown in FIG. 12. Further, as exemplified in the table information in FIG. 12, the possibility of the target object slipping may be evaluated stepwise in accordance with a combination of the slipperiness of the road surface and the slipperiness of the posture. In the example shown in FIG. 12, in a case where the road surface state and the posture are both slippery, it is judged that the possibility of a slip is extremely high.

In the danger avoidance apparatus 240 of this embodiment, the possibility of the target object slipping is judged on the basis of the slipperiness of both the posture of the target object and the road surface state. Accordingly, it becomes possible to highly accurately judge the possibility of the target object slipping. As the danger avoidance image of this embodiment, the road surface state may be displayed in addition to the possibility of a slip and the dangerous area.

Other Embodiments

The present technology is not limited to the embodiments described above, and various other embodiments can be realized.

Figure 13:
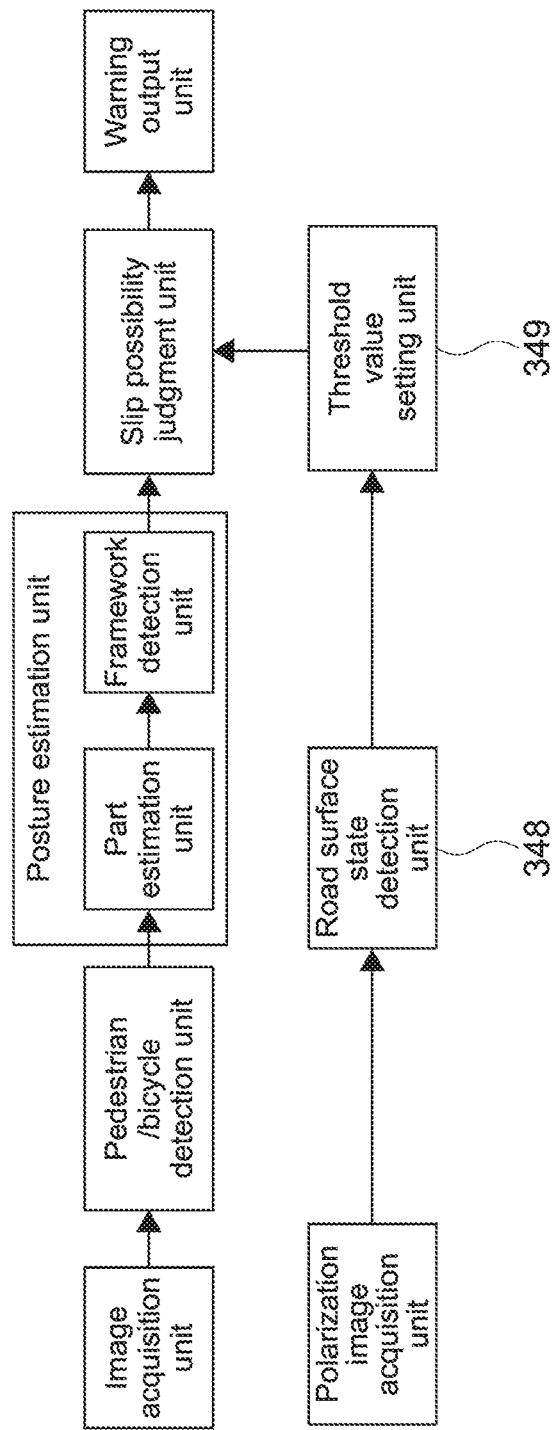
FIG. 13 A block diagram showing a functional configuration example of a danger avoidance apparatus according to another embodiment.

FIG. 13 is a block diagram showing a functional configuration example of a danger avoidance apparatus according to another embodiment. In this danger avoidance apparatus 340, a threshold value setting unit 349 reads and sets a threshold value corresponding to a road surface state. For example, as in table information shown in FIG. 14, a high threshold value is set for a dry road, and a somewhat lower threshold value is set for a wet road. In addition, a low threshold value is set for a snowy road. In other words, in this embodiment, the threshold value is dynamically set in accordance with a road surface state detected by a road surface state detection 348. It should be noted that as each threshold value, for example, a value statistically calculated for each road surface state or a value calculated by machine learning or the like is used.

Figure 15:
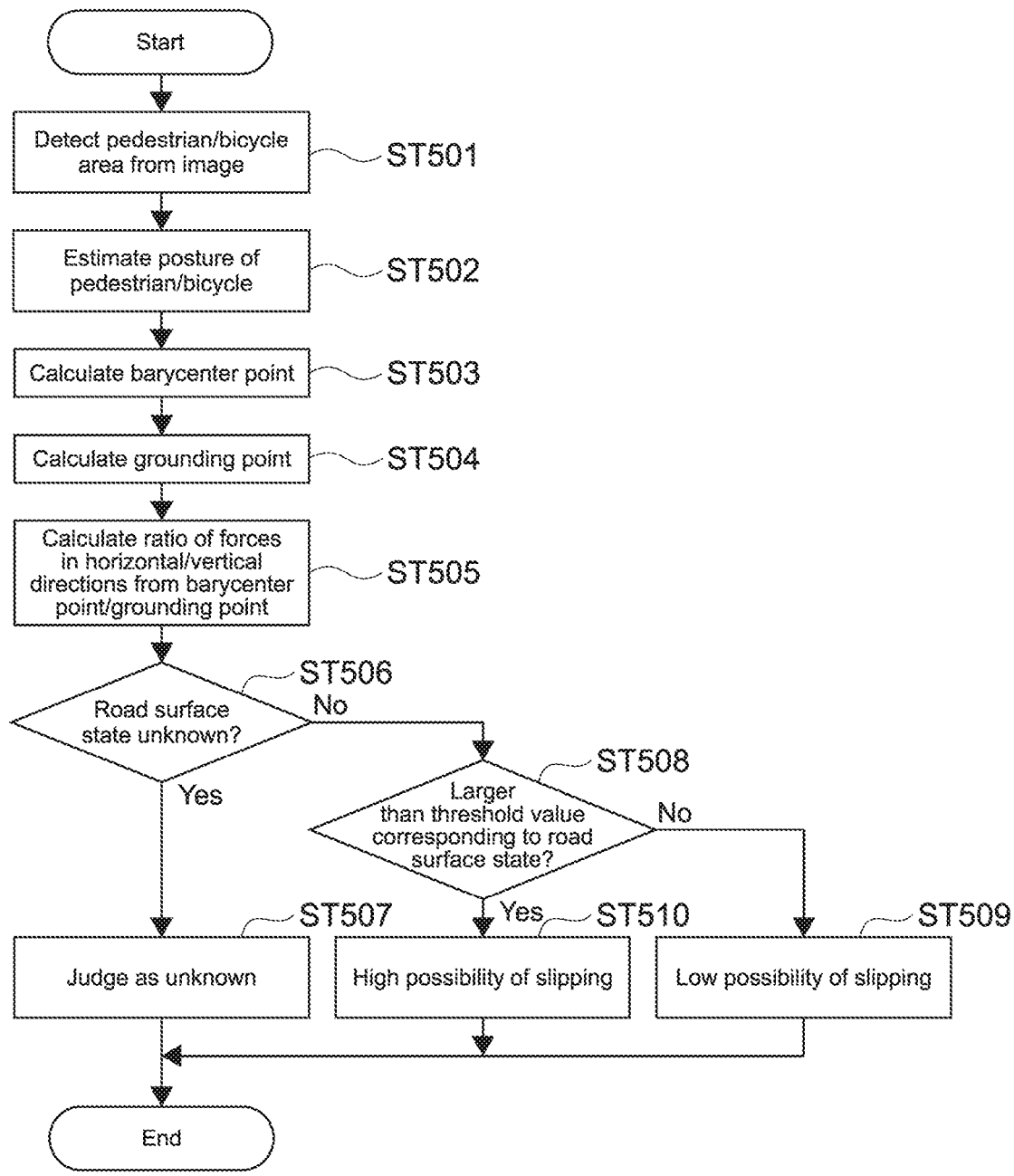
FIG. 15 A flowchart showing an example of a slip possibility judgment operation according to another embodiment.

FIG. 15 is a flowchart showing an example of a slip possibility judgment operation according to this embodiment. Steps 501 to 505 are substantially similar to Steps 101 to 105 shown in FIG. 5. When the force ratio=$F_{hor}/F_{vir}$=tan θ is calculated in Step 505, it is judged whether the road surface condition is unknown (Step 506). In the case of Yes, the possibility of a slip is judged as unknown (Step 507). In a case where the road surface state is not unknown (No in Step 506), the possibility of the target object slipping is judged on the basis of the threshold value corresponding to the road surface state (Steps 508, 509, and 510).

By dynamically setting the threshold value in accordance with the road surface state in this way, the possibility of the target object slipping can be judged highly accurately, and effective information for preventing a collision accident or the like from occurring can be provided to the driver of the automobile.

Figure 16:
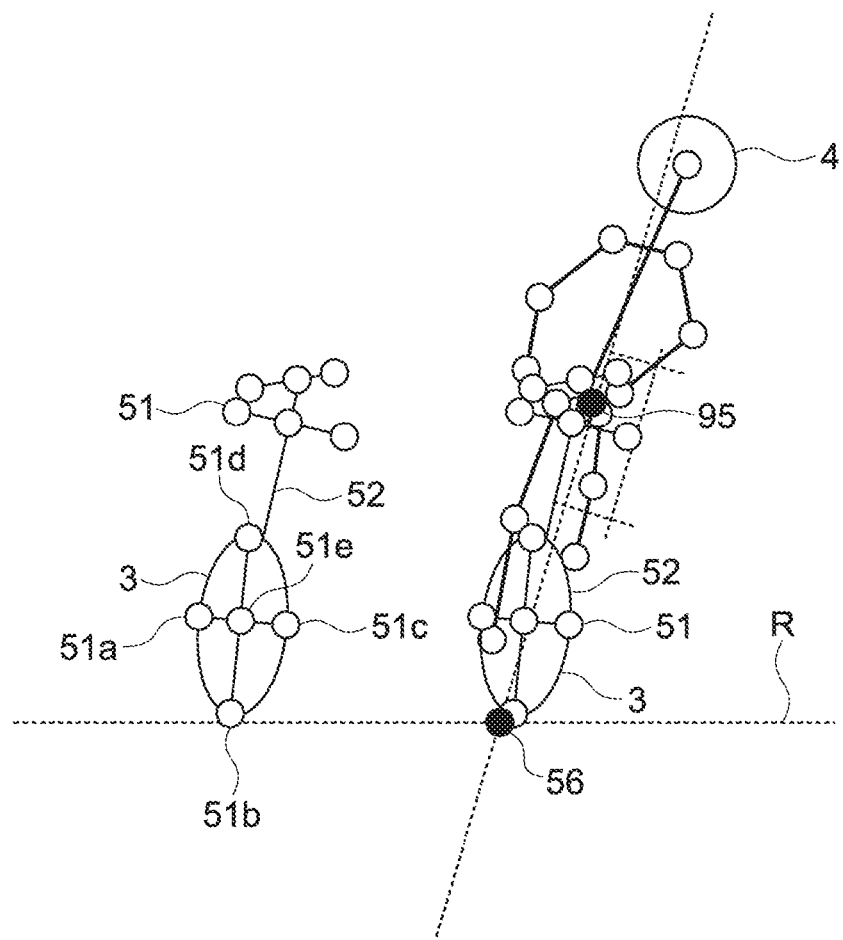
FIG. 16 A diagram for explaining another embodiment of a posture estimation regarding a bicycle and a rider thereof.

FIG. 16 is a diagram for explaining another embodiment of the posture estimation of the bicycle 3 and the rider 4 thereof. As shown in FIG. 16, a framework may be detected not only for the rider 4 but also for the bicycle 3. For example, a plurality of parts are preset for the bicycle 3, and a position of each part of the bicycle 3 is estimated on the basis of an input image. At this time, a technology similar to the framework estimation of the pedestrian 2, the rider 4, and the like may be used.

If the position of each part of the bicycle 3 is estimated, the white circles 51 and lines 52 preset in correspondence with the respective parts are set. Accordingly, the posture of the bicycle 3 can be estimated. It is possible to highly accurately estimate an overall posture of the bicycle 3 and the rider 4 thereof on the basis of the estimated posture of each of the bicycle 3 and the rider 4 thereof.

In judging the possibility of a slip, an overall barycenter point 95 of the bicycle 3 and the rider 4 thereof is calculated. Further, on the basis of the framework of the bicycle 3, a lowermost point thereof is detected as the grounding point 56 with the road surface R. On the basis of these barycenter point 95 and grounding point 56, the possibility of a slip can be judged highly accurately. Furthermore, it is also possible to estimate a steering amount of a handle on the basis of the white circles 51a to 51e at the wheel portion of the bicycle 3 and judge that the possibility of a slip is high in a case where the steering amount is large. In either case, by also estimating the posture of the bicycle 3, judgment accuracy on the possibility of a slip is improved.

In the descriptions above, the road surface is assumed to spread horizontally when judging the possibility of the target object slipping. Instead of this, information on a tilt angle of an actual road surface on which the target object stands may be acquired as the road surface information to be used for judging the possibility of a slip.

The information on a tilt angle of the road surface is calculated from, for example, a photographed image photographed by the front camera. Alternatively, the tilt angle information may be acquired on the basis of a polarization image, depth image, and the like of the road surface respectively acquired by the polarization camera, the depth sensor, and the like. Alternatively, information on a tilt angle of a road surface on which a pedestrian or the like who is right in front stands may be acquired from current location information acquired by a GPS or the like, map information, road traffic information, and the like. Several types of tilt angle patterns may be prepared in advance so that a closest tilt angle can be selected from them.

The angle θ between the straight line L connecting the barycenter point 55 and the grounding point 56 shown in FIG. 6 and the vertical direction or the angle θ' between the straight line L connecting the barycenter point 55 and the grounding point 56 and the road surface R is calculated as appropriate, for example, using the acquired tilt angle information. Using these angles, it becomes possible to highly accurately judge the possibility of the target object slipping with respect to the tilted road surface R.

In the descriptions above, the barycenter point of the target object is calculated as a feature point for judging the possibility of a slip. The present technology is not limited to this, and a barycenter point of a head portion or waist portion may be used as the feature point.

A parameter different from the angle between the straight line connecting the feature point and the contact point and the road surface may be used as a criterion for judging the possibility of a slip based on a posture. For example, the possibility of a slip may be judged on the basis of a positional relationship among respective parts, or the like. Moreover, with an image (partial image) of the target object, or the like being an input, the possibility of a slip may be judged by machine learning or the like.

The possibility of a slip of the target object existing on the left- or right-hand side of or behind the automobile may be judged on the basis of photographed images photographed by side cameras on left- and right-hand sides, a rear camera, and the like.

The system that includes the automobile including the various cameras such as a front camera, the sensors, the braking apparatus, and the steering apparatus and the danger avoidance apparatus according to the present technology corresponds to one embodiment of a danger avoidance system according to the present technology. Of course, the present technology is not limited to these configurations.

The present technology is applicable to not only automobiles, but also various mobile object apparatuses such as a two-wheeled vehicle and an automatic three-wheeled vehicle, and is also applicable to various technical fields such as a simulation apparatus thereof and games. Further, the present technology is applicable to not only the mobile object apparatus but also a monitoring system and the like.

For example, it is possible to judge a possibility of a slip of a pedestrian or the like walking on a bridge, a platform, or the like and notify that person or surrounding people.

At least two of the feature portions according to the present technology described above can be combined. In other words, various feature portions described in the respective embodiments may be arbitrarily combined without distinguishing the embodiments from one another. Moreover, the various effects described above are mere examples and should not be limited thereto, and other effects may also be exerted.

It should be noted that the present technology can also take the following configurations.

(1) An information processing apparatus, including:

a detection unit that detects a target object from an input image;

an estimation unit that estimates a posture of the detected target object; and a judgment unit that judges a possibility of the target object slipping on the basis of the estimated posture.

(2) The information processing apparatus according to (1), in which the detection unit is capable of detecting a pedestrian from the input image, and the judgment unit judges a possibility of the pedestrian slipping on the basis of an estimated posture of the pedestrian.

(3) The information processing apparatus according to (1) or (2), in which the detection unit is capable of detecting a two-wheeled vehicle and a rider thereof from the input image, the estimation unit estimates at least a posture of the rider, and the judgment unit judges a possibility of the two-wheeled vehicle slipping on the basis of the estimated posture of the rider.

(4) The information processing apparatus according to (3), in which the estimation unit estimates a posture of the two-wheeled vehicle, and the judgment unit judges the possibility of the two-wheeled vehicle slipping on the basis of the estimated posture of each of the two-wheeled vehicle and the rider thereof.

(5) The information processing apparatus according to any one of (1) to (4), in which the judgment unit calculates a feature point related to the target object and a contact point of the target object with a road surface on the basis of the estimated posture, and judges the possibility of a slip on the basis of an angle between a straight line connecting the feature point and the contact point and the road surface.

(6) The information processing apparatus according to (5), in which the feature point is a barycenter point of the target object.

(7) The information processing apparatus according to (5), in which the detection unit is capable of detecting a two-wheeled vehicle and a rider thereof from the input image, and the judgment unit calculates, as the feature point, a barycenter point of the rider or an overall barycenter point of the two-wheeled vehicle and the rider thereof.

(8) The information processing apparatus according to any one of (1) to (7), further including an acquisition unit that acquires road surface information on a road surface state, in which the judgment unit judges the possibility of a slip on the basis of the acquired road surface information.

(9) The information processing apparatus according to (8), in which the judgment unit judges slipperiness of a road surface on the basis of the acquired road surface information, and judges the possibility of a slip on the basis of the judged slipperiness.

(10) The information processing apparatus according to (8) or (9), in which the road surface information includes a tilt angle of the road surface, and the judgment unit calculates the angle between the straight line and the road surface on the basis of the tilt angle of the road surface.

(11) The information processing apparatus according to any one of (1) to (10), in which the estimation unit estimates a framework of the detected target object.

(12) The information processing apparatus according to any one of (1) to (11), in which the information processing apparatus is mounted on a mobile object apparatus, and the information processing apparatus further includes an output unit that generates and outputs danger avoidance information for avoiding a danger related to a drive of the mobile object apparatus on the basis of the judged possibility of a slip.

(13) The information processing apparatus according to (12), in which the output unit outputs an image with which the target object that has been judged as having a high possibility of slipping can be identified.

(14) The information processing apparatus according to (12) or (13), in which the output unit outputs an image including a dangerous area set for the target object that has been judged as having a high possibility of slipping.

REFERENCE SIGNS LIST

R road surface
L straight line connecting barycenter point and grounding point
1 target object
2 pedestrian
3 bicycle
4 rider of bicycle
40, 240, 340 danger avoidance apparatus
41 image acquisition unit
42 object detection unit
43 posture estimation unit
44, 244 possibility judgment unit
45 warning output unit
55, 95 barycenter point
56 grounding point
60 danger avoidance image
61 dangerous area
62 danger avoidance path
100 automobile
246 posture judgment unit
247 polarization image acquisition unit
248, 348 road surface state detection unit
249 road surface judgment unit
349 threshold value setting unit

The invention claimed is:

1. An information processing apparatus, comprising:
   circuitry configured to:
   detect a target object from an input image;
   estimate a posture of the target object;
   calculate each of a feature point associated with the target object, and a contact point of the target object with a road surface,
      wherein the feature point and the contact point are calculated based on the posture of the target object;
   determine a possibility of a slip of the target object based on an angle between the road surface and a straight line that connects the feature point and the contact point;
   generate danger avoidance information based on the possibility of the slip of the target object; and
   output the danger avoidance information.

2. The information processing apparatus according to claim 1, wherein the circuitry is further configured to:
   detect a pedestrian from the input image;
   estimate a posture of the pedestrian; and
   determine a possibility of a slip of the pedestrian based on the posture of the pedestrian.

3. The information processing apparatus according to claim 1, wherein the circuitry is further configured to:
   detect a two-wheeled vehicle and a rider of the two-wheeled vehicle from the input image;
   estimate a posture of the rider; and
   determine a possibility of a slip of the two-wheeled vehicle based on the posture of the rider.

4. The information processing apparatus according to claim 3, wherein the circuitry is further configured to:
   estimate a posture of the two-wheeled vehicle; and
   determine the possibility of the slip of two-wheeled vehicle based on each of the posture of the two-wheeled vehicle and the posture of the rider.

5. The information processing apparatus according to claim 1, wherein the feature point is a barycenter point of the target object.

6. The information processing apparatus according to claim 1, wherein the circuitry is further configured to:
   detect a two-wheeled vehicle and a rider of the two-wheeled vehicle from the input image; and
   calculate, as the feature point, at least one of a barycenter point of the rider or an overall barycenter point of the two-wheeled vehicle and the rider.

7. The information processing apparatus according to claim 1, wherein the circuitry is further configured to:
   acquire road surface information associated with a road surface state; and
   determine the possibility of the slip of the target object based on the road surface information.

8. The information processing apparatus according to claim 7, wherein the circuitry is further configured to:
   determine slipperiness of the road surface based on the road surface information; and
   determine the possibility of the slip of the target object based on the slipperiness of the road surface.

9. The information processing apparatus according to claim 1, wherein the circuitry is further configured to:
   acquire road surface information associated with a road surface state, wherein the road surface information includes a tilt angle of the road surface; and
   calculate the angle between the straight line and the road surface based on the tilt angle of the road surface.

10. The information processing apparatus according to claim 1, wherein the circuitry is further configured to estimate a framework of the target object.

11. The information processing apparatus according to claim 1, wherein
   the information processing apparatus is mountable on a mobile object apparatus, and
   the circuitry is further configured to generate the danger avoidance information to avoid a danger associated with a drive of the mobile object apparatus.

12. The information processing apparatus according to claim 11, wherein
   the circuitry is further configured to output a target image that includes the target object.

13. The information processing apparatus according to claim 11, wherein the circuitry is further configured to:
   determine a dangerous area for the target object from the input image; and
   output a target image that includes the dangerous area for the target object.

14. An information processing method, comprising:
   detecting a target object from an input image;
   estimating a posture of the target object;
   calculating each of a feature point associated with the target object, and a contact point of the target object with a road surface,
      wherein the feature point and the contact point are calculated based on the posture of the target object;
   determining a possibility of a slip of the target object based on an angle between the road surface and a straight line that connects the feature point and the contact point;
   generating danger avoidance information based on the possibility of the slip of the target object; and
   outputting the danger avoidance information.

15. A non-transitory computer-readable medium having stored thereon computer-readable instructions, which when executed by a computer, cause the computer to execute operations, the operations comprising:
   detecting a target object from an input image;
   estimating a posture of the target object;
   calculating each of a feature point associated with the target object, and a contact point of the target object with a road surface,
      wherein the feature point and the contact point are calculated based on the posture of the target object;
   determining a possibility of a slip of the target object based on an angle between the road surface and a straight line that connects the feature point and the contact point;
   generating danger avoidance information based on the possibility of the slip of the target object; and
   outputting the danger avoidance information.

16. An information processing system, comprising:
   an imaging device configured to capture an image; and
   circuitry configured to:
   detect a target object from the captured image;
   estimate a posture of the target object;
   calculate each of a feature point associated with the target object, and a contact point of the target object with a road surface,
      wherein the feature point and the contact point are calculated based on the posture of the target object;

determine a possibility of a slip of the target object based on an angle between the road surface and a straight line that connects the feature point and the contact point;

generate danger avoidance information based on the possibility of the slip of the target object; and output the danger avoidance information.

17. An information processing system according to claim 16, further comprising:

a control device configured to control at least one of a speed or a direction of a vehicle, and the information processing system is implemented into the vehicle.

* * * * *